(12) United States Patent
Xia et al.

(10) Patent No.: US 10,429,894 B2
(45) Date of Patent: Oct. 1, 2019

(54) BENDABLE MOBILE TERMINAL

(71) Applicant: SHENZHEN ROYOLE TECHNOLOGIES CO. LTD., Shenzhen, Guangdong (CN)

(72) Inventors: Xinyuan Xia, Guangdong (CN); Songling Yang, Guangdong (CN); Chao Jiang, Guangdong (CN); Zihong Liu, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/769,691

(22) PCT Filed: Dec. 31, 2015

(86) PCT No.: PCT/CN2015/100314
§ 371 (c)(1),
(2) Date: Apr. 19, 2018

(87) PCT Pub. No.: WO2017/113393
PCT Pub. Date: Jul. 6, 2017

(65) Prior Publication Data
US 2018/0314299 A1    Nov. 1, 2018

(51) Int. Cl.
*G06F 1/16* (2006.01)
*G09F 9/30* (2006.01)
*H04M 1/02* (2006.01)

(52) U.S. Cl.
CPC .......... *G06F 1/1652* (2013.01); *G06F 1/1681* (2013.01); *G09F 9/30* (2013.01); *G06F 1/1626* (2013.01); *H04M 1/022* (2013.01)

(58) Field of Classification Search
None
See application file for complete search history.

(56) References Cited

U.S. PATENT DOCUMENTS 8,369,075 B2 *  2/2013  Huang ..................... G09F 9/33
                                                    248/297.21
8,605,421 B2 * 12/2013  Verschoor ............ G06F 1/1652
                                                    361/679.21
(Continued)

FOREIGN PATENT DOCUMENTS

CN      104135831      11/2014
CN      104851365       8/2015
(Continued)

OTHER PUBLICATIONS

International search report dated Sep. 14, 2016 from corresponding application No. PCT/CN2015/100314.

*Primary Examiner* — Xanthia C Cunningham
(74) *Attorney, Agent, or Firm* — Hauptman Ham, LLP (57) ABSTRACT

A bendable mobile terminal includes two bendable mechanisms. The bendable mobile terminal is capable of being bent at the locations of the two bendable mechanisms. One of the bendable mechanisms is located at a middle portion between two opposite ends of the bendable mobile terminal, and the other bendable mechanism is located at a middle portion between the one bendable mechanism and one end of the bendable mobile terminal. By employing the two bendable mechanisms, the bendable mobile terminal is able to stay in arbitrary position after being bent, and provide support by its own bending, thereby reducing unnecessary components, and improving the portability of the mobile terminal.

16 Claims, 7 Drawing Sheets

(56) References Cited

U.S. PATENT DOCUMENTS

| | | | | |
|---|---|---|---|---|
| 9,179,559 B1* | 11/2015 | Kim | | G06F 1/1616 |
| 9,337,434 B2* | 5/2016 | Lindblad | | H01L 51/52 |
| 9,793,502 B2* | 10/2017 | Saeki | | H05K 999/99 |
| 10,028,339 B2* | 7/2018 | Jung | | H01L 51/0097 |
| 10,151,424 B2* | 12/2018 | Hong | | F16M 13/00 |
| 2010/0085274 A1* | 4/2010 | Kilpatrick, II | | G06F 1/1616 |
| | | | | 345/1.3 |
| 2011/0188189 A1* | 8/2011 | Park | | G05B 11/01 |
| | | | | 361/679.05 |
| 2012/0033353 A1 | 2/2012 | Huang | | |
| 2012/0307423 A1* | 12/2012 | Bohn | | G06F 1/1641 |
| | | | | 361/679.01 |
| 2013/0002133 A1* | 1/2013 | Jin | | H01L 51/524 |
| | | | | 313/511 |
| 2014/0099479 A1* | 4/2014 | Krall | | B32B 3/14 |
| | | | | 428/174 |
| 2014/0112704 A1* | 4/2014 | Vanska | | G06F 1/16 |
| | | | | 403/112 |
| 2014/0285476 A1* | 9/2014 | Cho | | G06F 1/1601 |
| | | | | 345/204 |
| 2015/0022436 A1* | 1/2015 | Cho | | G06F 1/1652 |
| | | | | 345/156 |
| 2015/0023031 A1* | 1/2015 | Endo | | H01L 27/323 |
| | | | | 362/427 |
| 2015/0077917 A1 | 3/2015 | Song | | |
| 2015/0103023 A1* | 4/2015 | Iwaki | | G06F 3/0488 |
| | | | | 345/173 |
| 2015/0146069 A1* | 5/2015 | Yamazaki | | H04N 5/23293 |
| | | | | 348/333.01 |
| 2016/0105542 A1* | 4/2016 | Lee | | H04M 1/72597 |
| | | | | 455/566 |
| 2017/0003793 A1* | 1/2017 | Gao | | G06F 3/0416 |
| 2017/0199712 A1* | 7/2017 | Lee | | G01B 7/22 |
| 2018/0103132 A1* | 4/2018 | Prushinskiy | | G06F 1/1626 |
| 2018/0145269 A1* | 5/2018 | Myeong | | G06F 1/1652 |

FOREIGN PATENT DOCUMENTS

| | | | | |
|---|---|---|---|---|
| CN | 105407194 | | 3/2016 | |
| CN | 106325373 A | * | 1/2017 | G06F 3/0416 |

\* cited by examiner

BENDABLE MOBILE TERMINAL

RELATED APPLICATIONS

The present application is a National Phase of International Application Number PCT/CN2015/100314, filed Dec. 31, 2015.

TECHNICAL FIELD

The present disclosure relates to the field of mobile terminals, and more particularly relates to a bendable mobile terminal.

BACKGROUND

Portable mobile terminals such as mobile phones, tablet computers, and so on, have been widely used. With the development of flexible display technology, the above mobile terminals develop gradually toward the directions of being bendable. On one hand, current mobile terminals usually cannot be bent. On the other hand, if the mobile terminals are provided with functions of supporting themselves, they are usually use external support structures. However, the addition of the external structures increases the weight and volume of the mobile terminals themselves and reduces the portability.

SUMMARY

Embodiments of the present disclosure provide a bendable mobile terminal, which enables the mobile terminal to be bent and provides support by bending itself, so as to improve the portability of the mobile terminal.

In order to achieve the above object, the embodiments of the present disclosure provide the following technical solutions:

The present disclosure provides a bendable mobile terminal, which includes two bendable mechanisms. The bendable mobile terminal is capable of being bent at the locations of the two bendable mechanisms. One of the bendable mechanisms is located at a middle portion between two opposite ends of the bendable mobile terminal, and the other bendable mechanism is located at a middle portion between the one bendable mechanism and one end of the bendable mobile terminal.

With the arrangement of the two bendable mechanisms, the bendable mobile terminal provided by the present disclosure can provide its own supporting function after any one of the bendable mechanisms being bent, so as to reduce additional supporting components and improve the portability of the mobile terminal.

BRIEF DESCRIPTION OF THE DRAWINGS

To better illustrate the technical solutions of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative efforts.

DETAILED DESCRIPTION OF ILLUSTRATED EMBODIMENTS

The technical solutions of embodiments of the present disclosure will be described clearly and completely in combination with the accompanying drawings of the embodiments of the present disclosure.

Figure 1:
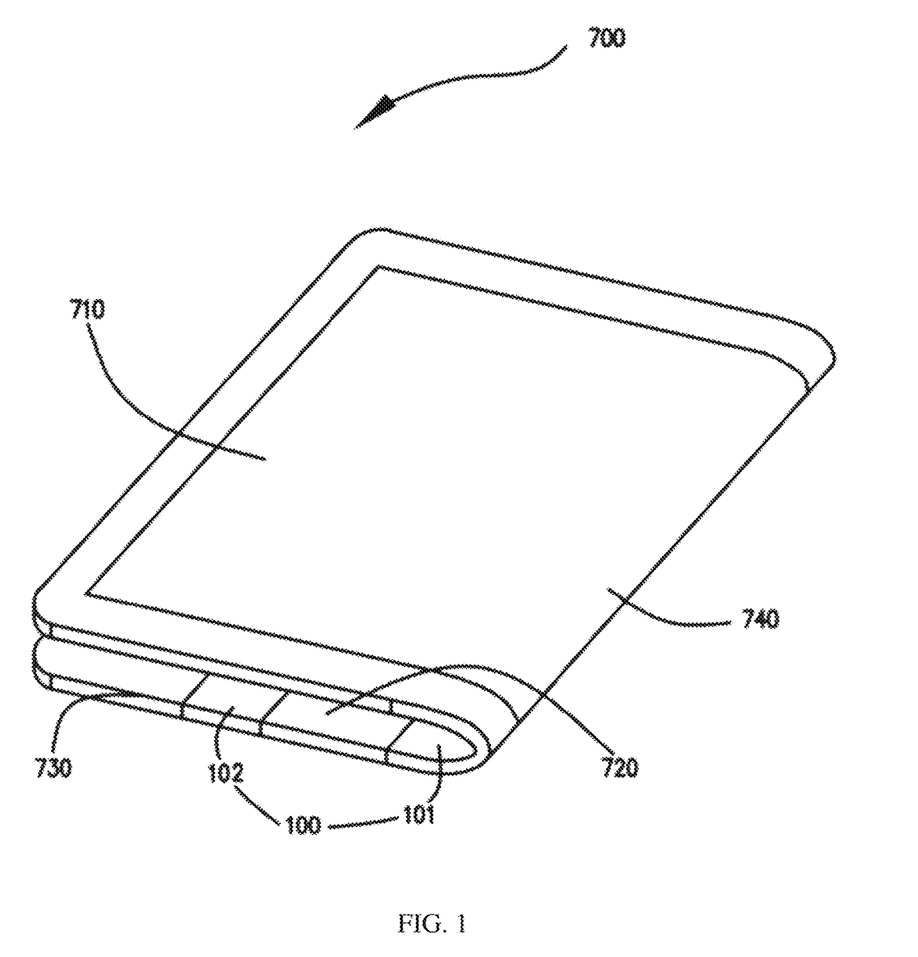
FIG. 1 is a schematic diagram illustrating a state of a bendable mobile terminal according to an embodiment of the present disclosure, which has two bendable mechanisms, and one of the bendable mechanisms is in a bent state.
Figure 2:
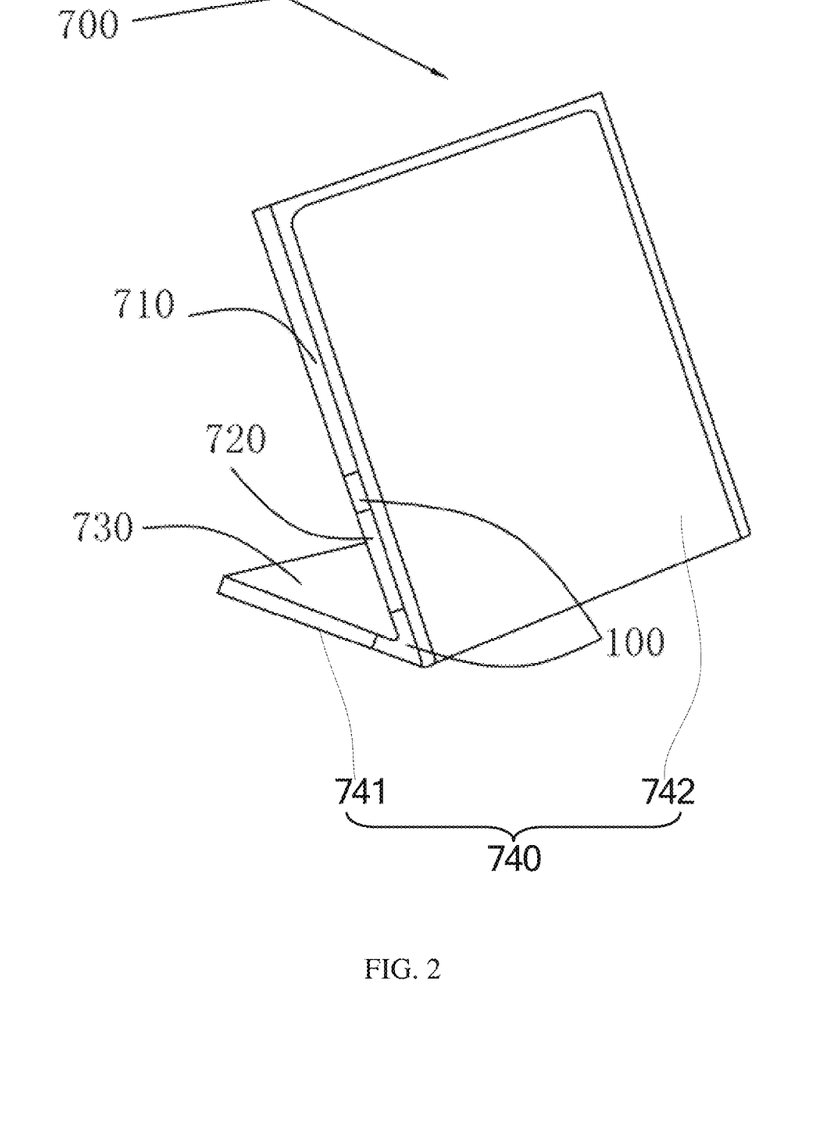
FIG. 2 is a schematic diagram illustrating another state of the bendable mobile terminal of FIG. 1, with the other bendable mechanism being in a bent state.
Figure 3:
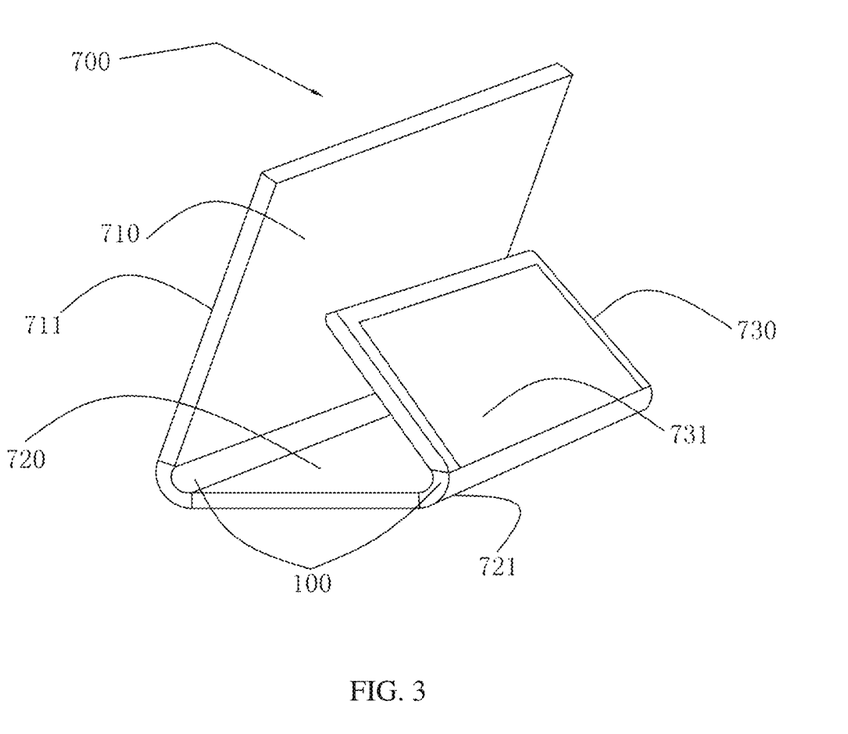
FIG. 3 is a schematic diagram illustrating another state of the bendable mobile terminal of FIG. 1, with both the two bendable mechanisms being in a bent state.

Referring to FIGS. 1 to 3, the present disclosure provides a bendable mobile terminal 700, which may be a mobile terminal device such as a tablet computer, a mobile phone, a notebook, and so on. The bendable mobile terminal 700 includes two bendable mechanisms 100, and the bendable mobile terminal 700 is capable of being bent at the locations of the two bendable mechanisms 100. The bendable mechanisms 100 include a first bendable mechanism 101 and a second bendable mechanism 102, the first bendable mechanism 101 is located at a middle portion between two opposite ends of the bendable mobile terminal 700, and the second bendable mechanism 102 is located at a middle portion between the first bendable mechanism 101 and one of the two opposite ends of the bendable mobile terminal 700. Therefore, the bendable mobile terminal 700 is able to be in a state of being folded in half as illustrated in FIG. 1, with only the first bendable mechanism 101 being bent; or in a first standing state as illustrated in FIG. 2, with only the second bendable mechanism 102 being bent; or in a second standing state as illustrated in FIG. 3, with both of the two bendable mechanisms 100 being bent; or in a fully deployed state (not illustrated) with both of the two bendable mechanisms 100 not being bent. It can be seen that, with the arrangement of the two bendable mechanisms 100, the bendable mobile terminal 700 can provide its own supporting function when any one of the bendable mechanisms 100 being bent, thereby dispensing with additional supporting components, and improving the portability of the mobile terminal.

Specifically, in the present embodiment, the bendable mobile terminal 700 further includes a first body 710, a second body 720, a third body 730, and a display screen 740. The first body 710, the second body 720, and the third body 730 are housings, and may accommodate components such as chips, batteries, cameras, and so on. The first body 710, the second body 720 and the third body 730 are sequentially connected. The first body 710 is connected to the second body 720 through the first bendable mechanism 101, and the second body 720 is connected to the third body 730 through the second bendable mechanism 102. The first body 710 is provided with a first bearing surface 711, the second body 720 is provided with a second bearing surface 721, and the third body 730 is provided with a third bearing surface 731. When the bendable mobile terminal 700 is fully deployed, the first bearing surface 711, the second bearing surface 721 and the third bearing surface 731 are in a same plane or substantially in a same plane. The areas of the second bearing surface 721 and the third bearing surface 731 are both smaller than the area of the first bearing surface 711. In the present embodiment, the area of the first bearing surface 711 is larger than the sum of the areas of the second bearing surface 721 and the third bearing surface 731, and the area of the second bearing surface 721 is substantially equal to the area of the third bearing surface 731. That is, the first bendable mechanism 101 is located at a position of about a half of the bendable mobile terminal 700, and the second bendable mechanism 102 is located at a position of about one quarter of the bendable mobile terminal 700.

In the present embodiment, the display screen 740 is a flexible display screen, the flexible display screen is located on a surface which is cooperatively formed by the first bearing surface 711, the second bearing surface 721, and the third bearing surface 731, that is, the first bearing surface 711, the second bearing surface 721, and the third bearing surface 731 are configured to cooperatively bear the display screen 740. Of course, in other embodiments, the third body 730 may not be provided with the display screen 740. Alternatively, the display screen 740 may include a flexible display screen 741 and a non-flexible display screen 742, and the flexible display screen 741 is located on a surface formed by the first bearing surface 711 and the second bearing surface 721, and the non-flexible display screen 742 is located on the third bearing surface 731.

The bendable mobile terminal 700 mainly includes four working states. The first working state is a fully deployed state (not illustrated), that is, the first body 710, the second body 720 and the third body 730 are coplanar, and the display screen is a flat surface, in this case, the flexible mobile terminal 700 can be used as a common tablet computer or a mobile phone. The second working state is a folded state, and in this case, the bendable mobile terminal 700 is folded in half through the first bendable mechanism 101 located between the first body 710 and the second body 720. The bendable mobile terminal 700 in this working status is easy to be carried. The third working state is a first standing state, and in this case, the bendable mobile terminal 700 can stand approximately when the second bendable mechanism 102 located between the second body 720 and the third body 730 being bent. Due to the self-balance of the bendable mobile terminal 700, in the third working state, the bendable mobile terminal 700 can only be bent in a small angle. And in this state, the third body 730 serves as a support, so that a portion of the display screen 740 covering the third bearing surface 731 does not display any image in an operating state, thereby saving energy consumption. The fourth working state is a second standing state, and in this case, both the two bendable mechanisms 100 are bent, so that the second body 720 serves as a support, with the first bearing surface 711 and the third bearing surface 731 facing opposite directions. In this state, a portion of the display screen 740 covering the second carrying surface 721 does not display any image in an operating state, thereby saving energy consumption. The display screen 740 covering the first carrying surface 711 and the third carrying surface 731 may be used simultaneously. The bendable mobile terminal 700 may also stay at a bent position under any bending state, so that the user may adjust the position according to actual needs.

Figure 4:
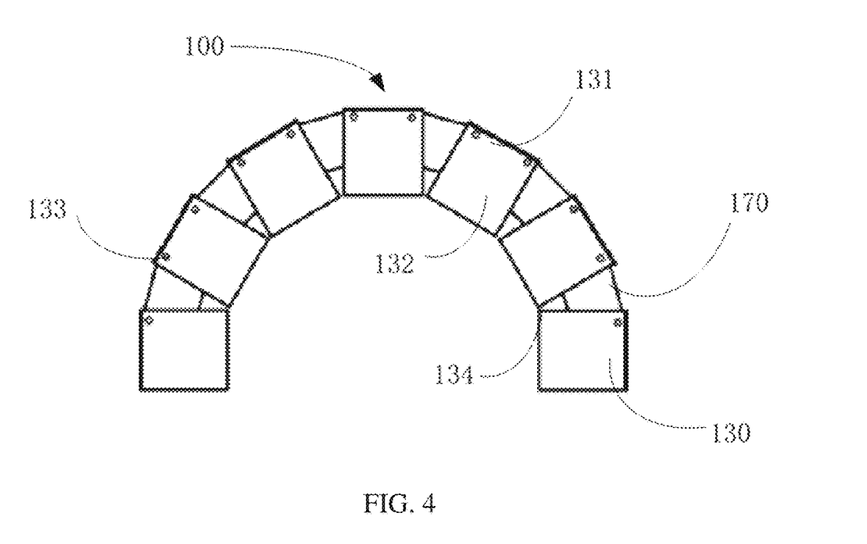
FIG. 4 is a structure schematic diagram of the bendable mechanism of FIG. 1, which is in a bent state, according to a first embodiment.
Figure 5:
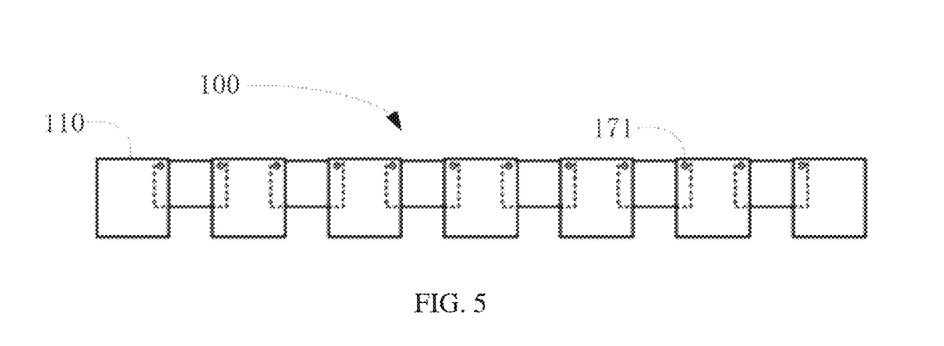
FIG. 5 is a side view of the bendable mechanism of FIG. 4, which is in a fully deployed state.
Figure 6:
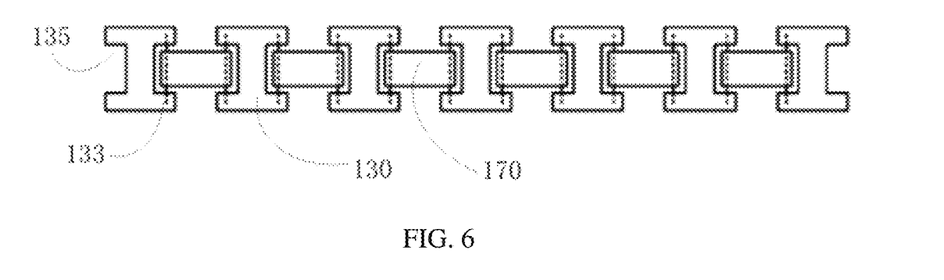
FIG. 6 is a plan view of the bendable mechanism of FIG. 4, which is in a fully deployed state.

Further, FIGS. 4 to 6 illustrate structure schematic diagrams of the bendable mechanism of the bendable mobile terminal of FIG. 1, according to a first embodiment. The bendable mechanism includes n bending portions and n−1 connecting portions, where n is an integer greater than or equal to two. Specifically, the bendable mechanism 100 includes seven bending portions 130 and six connecting portions 170. Two adjacent bending portions 130 are rotatably connected through the connecting portion 170 and form a chain-type structure. The bending portion 130 is a block with its bottom surface appearing a "⊥" shape. The bending portion 130 includes a first end 131 and a second end 132 opposite to each other. Two opposite edges of the first end 131 are respectively provided with a first hinge portion 133. The first hinge portion 133 may be a cylindrical protrusion or a hinge hole. In the present embodiment, the first hinge portion 133 is preferably a hinge hole. The edges of two opposite sides of the second end 132 are respectively provided with a first abutting portion 134. The first abutting portions 134 are two opposite corners on the second end 132 of the bending portion 130. Two opposite sides of the bending portion 130 respectively define a groove 135. The groove 135 penetrates through the first end 131 of the bending portion. The first hinge portions 133 are arranged on two opposite walls of the groove 135.

Further, the connecting portion 170 is a rectangular block. Two opposite edges of one end of the connecting portion 170 are respectively provided with a second hinge portion 171 hinged with the first hinge portion 133. The second hinge portion 171 may be a hinge hole or a cylindrical protrusion. In the present embodiment, the second hinge portion 171 is preferably a hinge hole passing through two opposite sides of the connecting portion 170. The first hinge portion 133 and the second hinge portion 171 are hinged and closely fitted with each other through a pin shaft, and the closely fitting increases frictional force, therefore, the bending portion 130 may stay at any position after rotated with respect to the connecting portion 170. Two opposite sides of the connecting portion 170 connected to the end where the second hinge portion 171 is located can be received in two opposite grooves 135 on two adjacent bending portions 130. The arrangement of the groove 135 increases the rotatable angle of the bending portion 130 relative to the connecting portion 170.

Further, the first ends 131 of the seven bending portions 130 joint together to form a support surface 110. It should be understood that, the support surface 110 may also be cooperatively formed by the end surface of the first end 131 of the bent portion 130 and the end surface of the connecting portion 170 where the second hinge portion 171 is located, as long as the support function can be achieve without prejudice to prevent the bendable mechanism to be bent. When the bendable mechanism 100 is fully deployed, the support surface 110 is a flat surface or is substantially a flat surface, and the support surface 110 can provide support for the flexible display screen of the mobile terminal in various bending states. The direction opposite to the support surface 110 is a first direction, and the bendable mechanism 130 may be bent toward the first direction in an arc shape. When the bendable mechanism 100 is bent, the seven bending portions 130 rotate together toward the first direction and can stay at any bent position. When the opposite first abutting portions 134 of two adjacent bending portions 130 abut against each other, the bendable mechanism 100 is in the first bending state. The first bending state refers to the bendable mechanism 100 reaches a minimum bending radius of curvature, that is, an extreme position for the bendable mechanism 100 after being bent.

Figure 7:
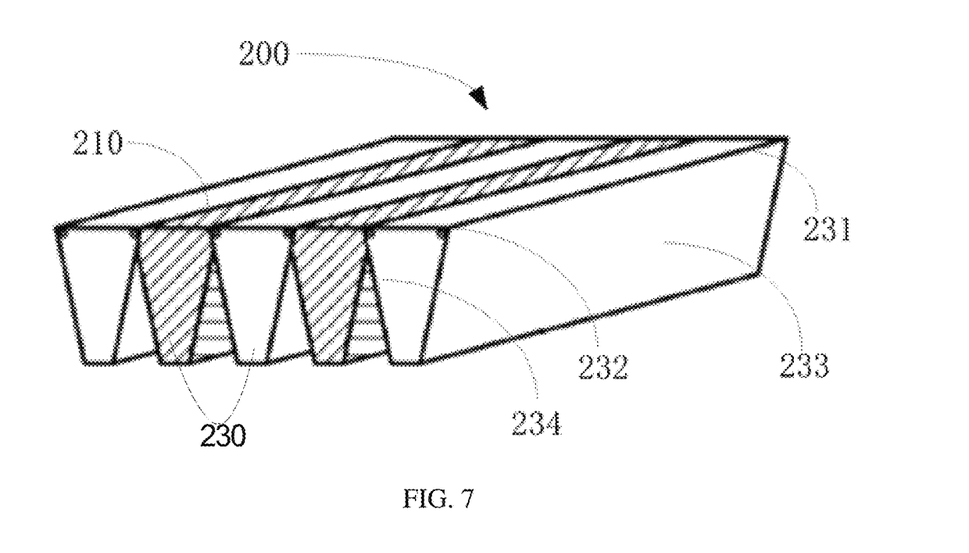
FIG. 7 is a structure schematic diagram of the bendable mechanism of FIG. 1, which is in a fully deployed state, according to a second embodiment.

FIG. 7 illustrates a structure schematic diagram of the bendable mechanism of the bendable mobile terminal of FIG. 1, according to a second embodiment. The bendable mechanism includes n bending portions and n−1 connecting portions, where n is an integer greater than or equal to two. Specifically, the bendable mechanism 200 includes five bending portions 230 and four connecting portions (not labeled). Two adjacent bending portions 230 are rotatably connected through the connecting portion and form a chain-type structure.

Further, the bending portion 230 is a straight prism with its two opposite end surfaces having the shape of an isosceles triangle or an isosceles trapezoid. When the end surface has the shape of an isosceles triangle, two edges connected by a bottom edge of each end surface of the bending portion are respectively provided with a third hinge portion. When the end surface has the shape of an isosceles trapezoid, two edges connected by a longer bottom edge of each end surface of the bending portion are respectively provided with a third hinge portion. In the present embodiment, the bending portion 230 is a straight prism with its end surface 234 having an isosceles trapezoid shaped. Two edges 231 connected by the longer bottom edge of the two bottom edges of the end surface 234 are respectively provided with a third hinge portion 232. The third hinge portion 232 is a number of hinge holes or hinge tabs arranged along the edge 231. The connecting portion is a pin shaft (not labeled). The third hinge portions 232 on two adjacent bending portions 230 are hinged and closely fitted with each other through the connecting portions, and the close fitting increases frictional force, therefore, the bending portions 230 may stay at any position after rotating with respect to an adjacent bending portion 230.

Further, the surface where the edges 231 of the five bending portions 230 are commonly located forms a support surface 210. When the bendable mechanism 200 is fully deployed, the support surface 210 is a flat surface, and the support surface 210 can provide support of the flexible display screen of the mobile terminal in various bending states. The direction opposite to the support surface 210 is a first direction, and the bendable mechanism 230 may be bent toward the first direction in an arc shape. When the bendable mechanism 200 is bent, the five bending portions 230 rotate together toward the first direction and can stay at any bent position. Two opposite surfaces each having an edge 231 from second abutting portions 233. When the opposite second abutting portions 233 of two adjacent bending portions 230 abut against each other, the bendable mechanism 200 is in the first bending state, that is, the bendable mechanism 200 reaches a minimum bending radius of curvature.

Figure 8:
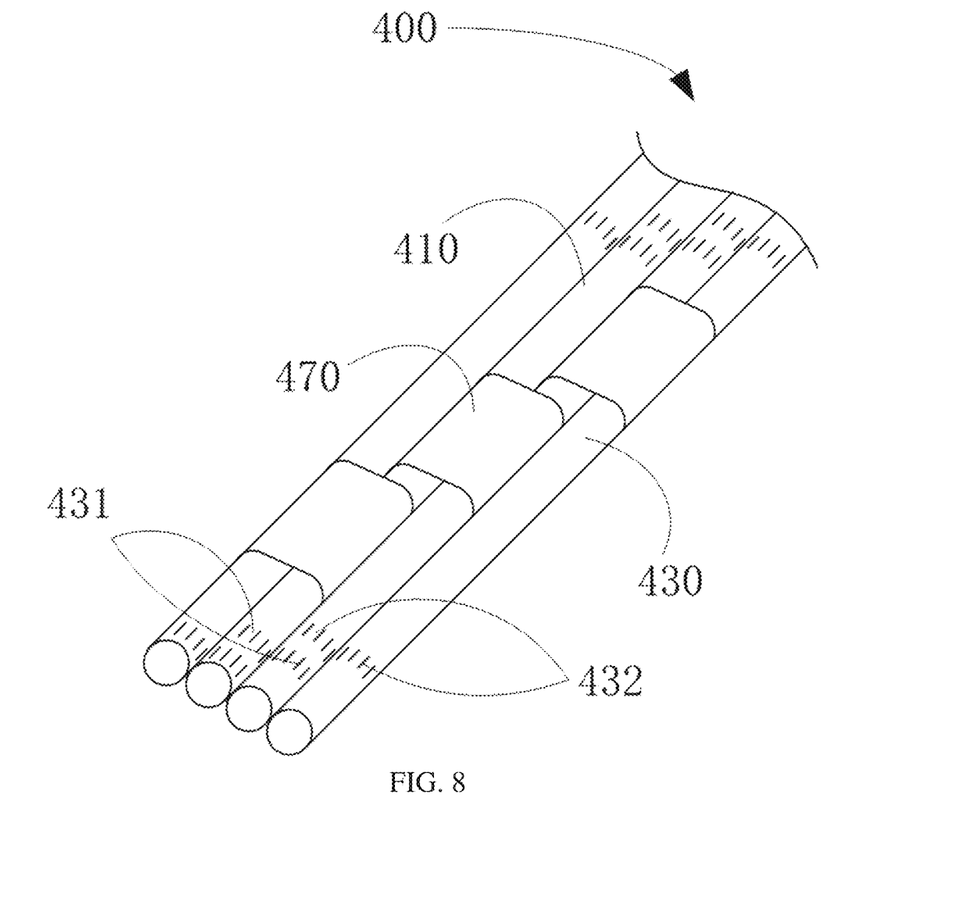
FIG. 8 is a structure schematic diagram of the bendable mechanism of FIG. 1, which is in a fully deployed state, according to a third embodiment.

FIG. 8 illustrates a structure schematic diagram of the bendable mechanism of the bendable mobile terminal of FIG. 1, according to a third embodiment. The bendable mechanism includes n bending portions and n−1 connecting portions, where n is an integer greater than or equal to three. Preferably, the bendable mechanism 400 includes four bending portions 430 and three connecting portions 470. Two adjacent bending portions 430 are rotatably connected through the connecting portion 470 and form a bendable chain-type structure. The bending portion 430 is a rod. Four bending portions 430 are arranged side by side and adjacent to each other. Each of the bending portions 430 defines a number of first external gears 431 and a number of groups of second external gears 432 on its outer surface along its axial direction. In the present embodiment, the amount of the first external gear 431 or the second external gear 432 is two groups. The bending portion 430 is provided with two groups of the first external gears 431 respectively defined on two opposite ends of the bending portion 430, and/or the two groups of the second external gears 432 respectively defined on two opposite ends of the bending portion 430. For example, as illustrated in FIG. 8, each end of the first bending portion 430 on the left has one group of the first/second external gears; each end of the second bending portion 430 in the middle has two groups of the first external gears 431, or has one group of the first external gears 431 and one group of the second external gears 432; each end of the third bending portion 430 in the middle has one group of the first external gears 431 and one group of the second external gears 432; each end of the fourth bending portion 430 on the right has one group of the second external gears 432. It should be understood that, the first external gear 431 and the second external gear 432 can be the same. The first external gears 431 on one of the bending portions 430 mesh with the first external gears 431 on the other bending portion 430 adjacent to one side of the one bending portions 430, and the second external gears 432 on the one bending portions 430 mesh with the second external gear 432 on another bending portion 430 adjacent to the other side of the one bending portions 430. The meshing among the gears can prevent the bending portions 430 from slipping during positioning.

Further, the connecting portion 470 is a thin-walled sleeve. The connecting portion 470 is sleeved on two adjacent bending portions 430 to make the two adjacent bending portions 430 closely fitted with each other, and the close fitting increases the frictional force, therefore, the bending portion 430 may stay at any position after rotating with respect to the adjacent bending portions 430. The surfaces composed by the bending portions 430 arranged side by side form a support surface. It should be understood that, the bendable mechanism 400 may include two opposite support surfaces. In the present embodiment, any one of them is selected to be the support surface 410. The support surface 410 can provide support for the flexible display screen of the mobile terminal in various bending states. The direction opposite to the support surface 410 is a first direction, and the bendable mechanism 430 may be bent toward the first direction in an arc shape. The four bending portions 430 rotate together toward the first direction and can stay at any bent position.

Figure 9:
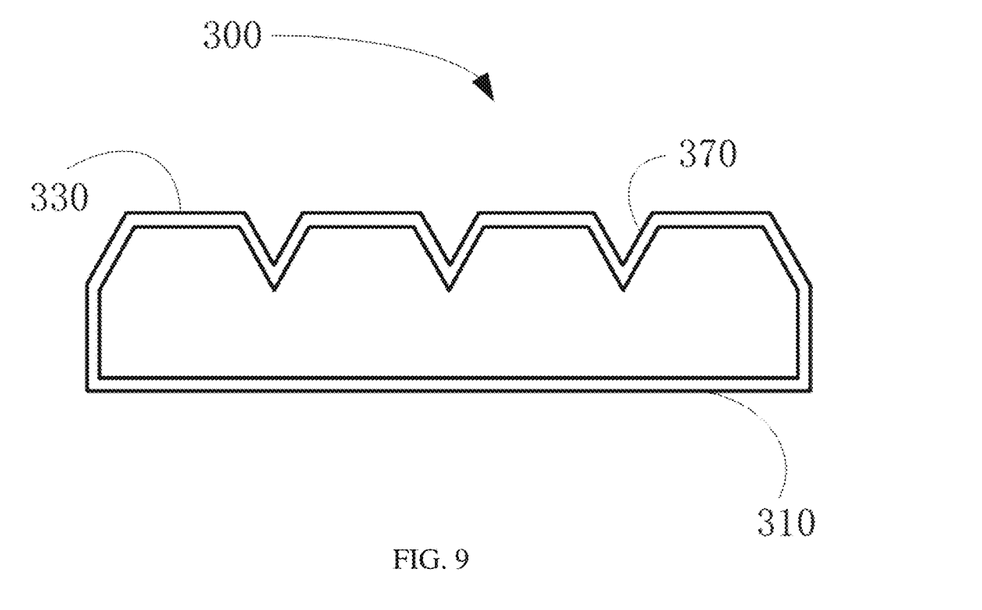
FIG. 9 is a structure schematic diagram of the bendable mechanism of FIG. 1, which is in a fully deployed state, according to a fourth embodiment.
Figure 10:
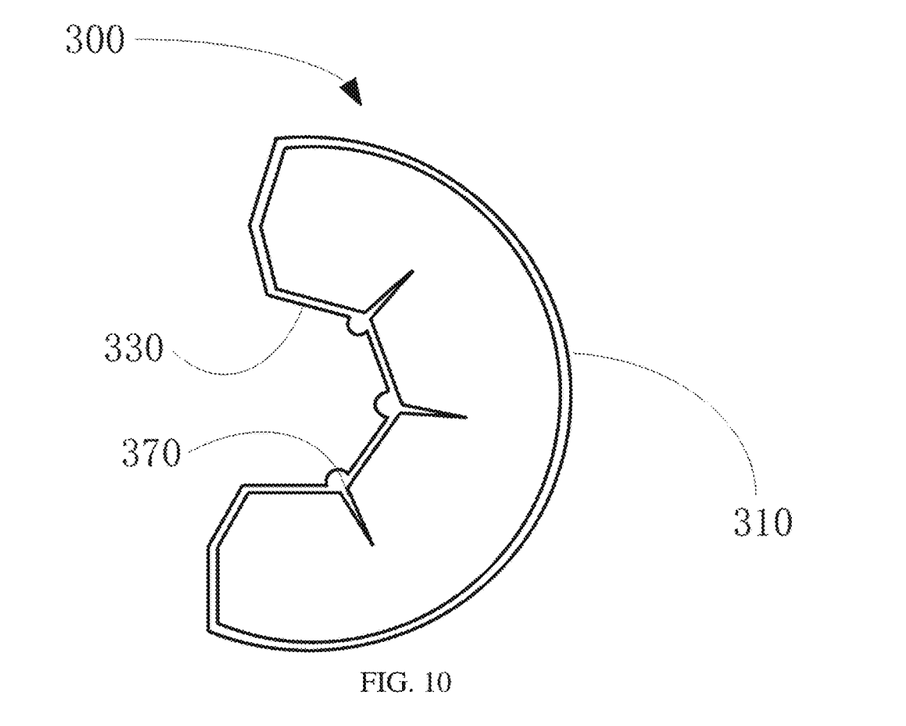
FIG. 10 is a structure schematic diagram of the bendable mechanism of FIG. 9, which is in a bent state.

FIGS. 9 to 10 illustrates structure schematic diagrams of the bendable mechanism of the bendable mobile terminal of FIG. 1, according to a fourth embodiment. The bendable mechanism 300 is a rectangular plate with a groove on its surface. The bendable mechanism 300 is integrally formed of a special material that has the property of keeping its shape after being bent and staying at the bent position, such as galvanized steel. One surface of the bendable mechanism 300 is provided with V-shaped grooves arranged in parallel and spaced apart. The V-shaped grooves are arranged along an extending direction of the surface and across two ends of the surface of the bendable mechanism 300. A portion penetrating through along the extending direction of the surface and connecting between two adjacent V-shaped grooves is a bump. The bump forms a bending portion 330, and the V-shaped groove forms a connecting portion 370. Two adjacent bending portions 330 are connected through the connecting portion 370 and form a bendable chain-type structure. In the present embodiment, the amount of the bending portions 330 is four, and the amount of the connecting portions is three. The outer surface of the bendable mechanism 300 is preferably wrapped with injection-molded rubber material to protect and prolong the service life of the bendable mechanism 300.

Further, a surface of the bendable mechanism 300 opposite to the surface where the connecting portion 370 is located is a support surface 310, and the support surface 310 can provide support for the flexible display screen of the mobile terminal in various bending states. The direction opposite to the support surface 310 is a first direction, and the bendable mechanism 300 may be bent toward the first direction in an arc shape. When the bendable mechanism 300 is bent, the four bending portions 330 rotate together toward the first direction and can stay at any bent position. When two opposite sides of each connecting portions 370 abut against each other, the bendable mechanism 300 is in the first bending state, that is, the bendable mechanism 300 reaches a minimum bending radius of curvature.

It should be understood that, the bendable mechanism of the bendable mobile terminal 700 can adopt one or a combination of any two of the bendable mechanisms in the first to fourth embodiments described above.

The above are the preferred embodiments of the present disclosure. It should be noted that those skilled in the art may still make various improvements and modifications without departing from the principle of the present disclosure, and such improvements and modifications are also considered to be within the scope of the present disclosure.

What is claimed is:

1. A bendable mobile terminal comprising two bendable mechanisms, and the bendable mobile terminal being capable of being bent at the locations of the two bendable mechanisms; wherein one of the bendable mechanisms is located at a middle portion between two opposite ends of the bendable mobile terminal, and the other bendable mechanism is located at a middle portion between the one bendable mechanism and one end of the bendable mobile terminal;

wherein the bendable mechanism comprises n bending portions and n−1 connecting portions, where n is an integer greater than or equal to two; two adjacent bending portions are rotatably connected through the connecting portion; the bendable mechanism is bent toward a first direction in an arc shape and positioned through the frictional force between the bending portions and the connecting portions; one side of the bendable mechanism opposite to the first direction forms a support surface;

wherein two opposite sides of the bending portion respectively define a groove, and two opposite sides of the connecting portion connected to the first end where the second hinge portions are located are received in two opposite grooves on two adjacent bending portions.

2. The bendable mobile terminal of claim 1, wherein two opposite edges of a first end of the bending portion are respectively provided with a first hinge portion, two opposite edges of one end of the connecting portion are respectively provided with a second hinge portion, each bending portion is connected with the adjacent bending portions through hinging the first hinge portion and the second hinge portion.

3. The bendable mobile terminal of claim 2, wherein the first hinge portions are arranged on two opposite walls of the groove.

4. The bendable mobile terminal of claim 2, wherein the bending portion is further provided with two first abutting portions at two sides of its second end opposite to the first end, wherein when the first abutting portions of two adjacent bending portions abut against each other, the bendable mechanism is in a first bending state.

5. The bendable mobile terminal of claim 1, wherein the bendable mobile terminal further comprises a first body, a second body, and a third body which are sequentially connected, wherein the first body is connected to the second body through one of the bendable mechanisms, and the second body is connected to the third body through the other one of the bendable mechanisms.

6. The bendable mobile terminal of claim 5, further comprising a display screen, wherein at least the first body and the second body are configured to bear against the display screen.

7. The bendable mobile terminal of claim 5, wherein the first body is provided with a first bearing surface, the second body is provided with a second bearing surface, and the third body is provided with a third bearing surface; wherein the area of the second bearing surface and the area of the third bearing surface are both smaller than the area of the first bearing surface.

8. The bendable mobile terminal of claim 7, wherein the area of the first bearing surface is larger than the sum of the areas of the second bearing surface and the third bearing surface.

9. A bendable mobile terminal comprising two bendable mechanisms, and the bendable mobile terminal being capable of being bent at the locations of the two bendable mechanisms; wherein one of the bendable mechanisms is located at a middle portion between two opposite ends of the bendable mobile terminal, and the other bendable mechanism is located at a middle portion between the one bendable mechanism and one end of the bendable mobile terminal;

wherein the bendable mechanism comprises n bending portions and n−1 connecting portions, where n is an integer greater than or equal to three; wherein the bending portion is a rod, and n bending portions are arranged side by side; the connecting portion is sleeved on two adjacent bending portions and thus making the two adjacent bending portions closely fitted with each other; wherein each of the bending portions defines a plurality of first external gears and a plurality of second external gears on its outer surface along its axial direction; the first external gears on one of the bending portions mesh with the first external gears on the other bending portion adjacent to one side of the one bending portion, and the second external gears on the one bending portions mesh with the second external gears on the other bending portion adjacent to the other side of the one bending portion; wherein the support surface is formed by the surfaces composed by the bending portions arranged side by side.

10. The bendable mobile terminal of claim 9, wherein the bendable mobile terminal further comprises a first body, a second body, and a third body which are sequentially connected, wherein the first body is connected to the second body through one of the bendable mechanisms, and the second body is connected to the third body through the other one of the bendable mechanisms.

11. The bendable mobile terminal of claim 10, further comprising a display screen, wherein at least the first body and the second body are configured to bear against the display screen.

12. The bendable mobile terminal of claim 10, wherein the first body is provided with a first bearing surface, the second body is provided with a second bearing surface, and the third body is provided with a third bearing surface; wherein the area of the second bearing surface and the area of the third bearing surface are both smaller than the area of the first bearing surface.

13. The bendable mobile terminal of claim 12, wherein the area of the first bearing surface is larger than the sum of the areas of the second bearing surface and the third bearing surface.

14. A bendable mobile terminal comprising:
two bendable mechanisms, and the bendable mobile terminal being capable of being bent at the locations of the two bendable mechanisms; wherein one of the bendable mechanisms is located at a middle portion between two opposite ends of the bendable mobile terminal, and the other bendable mechanism is located at a middle portion between the one bendable mechanism and one end of the bendable mobile terminal;

a first body, a second body, and a third body which are sequentially connected, wherein the first body is connected to the second body through one of the bendable mechanisms, and the second body is connected to the third body through the other one of the bendable mechanisms; wherein the first body is provided with a first bearing surface, the second body is provided with a second bearing surface, and the third body is provided with a third bearing surface; and a display screen comprising a flexible display screen and a non-flexible display screen, wherein the flexible display screen is located on a surface formed by the first bearing surface and the second bearing surface, and the non-flexible display screen is located on the third bearing surface e.

15. The bendable mobile terminal of claim 14, wherein the area of the second bearing surface and the area of the third bearing surface are both smaller than the area of the first bearing surface.

16. The bendable mobile terminal of claim 15, wherein the area of the first bearing surface is larger than the sum of the areas of the second bearing surface and the third bearing surface.

* * * * *